United States Patent
Dixon et al.

(10) Patent No.: US 11,466,225 B2
(45) Date of Patent: Oct. 11, 2022

(54) LUBRICANT AND REFRIGERANT COMPOSITIONS COMPRISING POLYALKYLENE GLYCOLS AND USES THEREOF

(71) Applicant: Shrieve Chemical Products, Inc., The Woodlands, TX (US)

(72) Inventors: Elizabeth Dixon, Fareham (GB); Christopher Seeton, Conroe, TX (US)

(73) Assignee: SHRIEVE CHEMICAL PRODUCTS, INC., The Woodlands, TX (US)

( * ) Notice: Subject to any disclaimer, the term of this patent is extended or adjusted under 35 U.S.C. 154(b) by 0 days.

(21) Appl. No.: 16/968,884

(22) PCT Filed: Mar. 4, 2019

(86) PCT No.: PCT/US2019/020473
§ 371 (c)(1),
(2) Date: Aug. 11, 2020

(87) PCT Pub. No.: WO2019/173172
PCT Pub. Date: Sep. 12, 2019

(65) Prior Publication Data
US 2021/0047578 A1 Feb. 18, 2021

Related U.S. Application Data

(60) Provisional application No. 62/639,187, filed on Mar. 6, 2018.

(51) Int. Cl.
| | |
|---|---|
| C09K 5/04 | (2006.01) |
| C09K 5/00 | (2006.01) |
| C10M 111/04 | (2006.01) |
| C10M 105/36 | (2006.01) |
| C10M 107/34 | (2006.01) |
| C10N 40/30 | (2006.01) |

(52) U.S. Cl.
CPC ........... *C10M 111/04* (2013.01); *C09K 5/045* (2013.01); *C10M 105/36* (2013.01); *C10M 107/34* (2013.01); *C09K 2205/126* (2013.01); *C09K 2205/24* (2013.01); *C10M 2207/2825* (2013.01); *C10M 2209/1085* (2013.01); *C10N 2040/30* (2013.01)

(58) Field of Classification Search
CPC .......................... C10M 111/04; C10M 105/36; C10M 107/34; C10M 2207/2825; C10M 2209/1085; C10M 2203/065; C10M 2203/1025; C10M 2207/2835; C10M 2209/043; C10M 2209/103; C10M 2209/1033; C10M 2209/105; C10M 2209/1055; C10M 2209/108; C10M 2209/109; C10M 171/008; C10M 169/04; C09K 5/045; C09K 2205/126; C09K 2205/24; C10N 2040/30; C10N 2020/097; C10N 2020/099; C10N 2020/105; C10N 2020/103; C10N 2020/106; C10N 2020/101; C10N 2020/02; C10N 2030/02; C10N 2030/10; C10N 2030/08; C10N 2030/06
USPC .......................................................... 252/68
See application file for complete search history.

(56) References Cited

U.S. PATENT DOCUMENTS

| | | | |
|---|---|---|---|
| 7,252,779 B2 | 8/2007 | Mosier et al. | |
| 2003/0153470 A1 | 8/2003 | Lawford et al. | |
| 2007/0069175 A1 | 3/2007 | Thomas et al. | |
| 2007/0203311 A1 | 8/2007 | Roy et al. | |
| 2008/0157022 A1 | 7/2008 | Singh et al. | |
| 2009/0283712 A1* | 11/2009 | Zyhowski | C07C 17/42 252/68 |
| 2010/0205980 A1 | 8/2010 | Dixon et al. | |
| 2012/0187330 A1 | 7/2012 | Singh et al. | |
| 2013/0137611 A1 | 5/2013 | Pierce et al. | |
| 2013/0197275 A1* | 8/2013 | Spiegler | A61Q 19/10 568/616 |
| 2013/0274163 A1 | 10/2013 | Matsumoto | |

FOREIGN PATENT DOCUMENTS

| | | |
|---|---|---|
| CN | 1200741 A | 12/1998 |
| CN | 1245481 A | 2/2000 |
| CN | 1376193 A | 10/2002 |
| CN | 101155892 A | 4/2008 |
| CN | 101389694 A | 3/2009 |
| CN | 101528886 A | 9/2009 |
| CN | 101605863 A | 12/2009 |
| CN | 102264877 A | 11/2011 |
| CN | 103108944 A | 5/2013 |
| EP | 2258789 A2 | 12/2010 |
| WO | 2008027515 A2 | 3/2008 |

(Continued)

OTHER PUBLICATIONS

International Search Report and Written Opinion issued in corresponding International Patent Application No. PCT/US2019/020473 dated May 29, 2019 (9 pages).
International Preliminary Report on Patentability issued in corresponding International Patent Application No. PCT/US2019/020473 dated Feb. 14, 2020 (13 pages).
Office Action issued in corresponding Chinese Patent Application No. 2019800170658 dated Dec. 10, 2021 (4 pages).
Kim et al., "Synthesis of Famesyl-Terminated Carbosilane Dendrimer," SYNTHESIS 2005, No. 3, pp. 381-386.
"Study on the synthesis of new terpene alkyl modified polysiloxane," Jun. 7, 2007 (with English abstract)(57 pages).

*Primary Examiner* — Prem C Singh
*Assistant Examiner* — Francis C Campanell
(74) *Attorney, Agent, or Firm* — Kilyk & Bowersox, P.L.L.C.

(57) ABSTRACT

The invention relates to a lubricating oil composition and a refrigerant composition containing a polyalkylene glycol having a terpenoid end group, such as a farnesol end group.

18 Claims, No Drawings

(56) References Cited

FOREIGN PATENT DOCUMENTS

WO      2014144554 A1    9/2014
WO      2015109095 A1    7/2015

* cited by examiner

LUBRICANT AND REFRIGERANT COMPOSITIONS COMPRISING POLYALKYLENE GLYCOLS AND USES THEREOF

This application is a National Stage Application of PCT/US2019/020473, filed Mar. 4, 2019 which claims the benefit under 35 U.S.C. § 119(e) of prior U.S. Provisional Patent Application No. 62/639,187, filed Mar. 6, 2018, which is incorporated in its entirety by reference herein.

FIELD OF THE INVENTION

This invention relates to novel polyalkylene glycols (PAGs) comprising terpenoid functionality, having utility as lubricants. The invention further relates to compositions comprising said polyalkylene glycol and a refrigerant, especially a low global warming potential (GWP) refrigerant such as a $C_3$-$C_5$ hydrofluoroolefin refrigerant, which may be used as heat transfer medium in refrigeration circuits of heating, ventilation and air conditioning (HVAC) systems such as refrigerators, air-conditioning units, chillers, heat pumps and the like.

DESCRIPTION OF RELATED ART

Fluoroolefins ("HFOs"/"fluoroalkenes") such as hydrofluoro-olefin (HFO) refrigerant HFO-1234yf (2,3,3,3-tetrafluoroprop-1-ene), and refrigerant HFO-1234ze (1,3,3,3-tetrafluoropropene), are under adoption as suitable low GWP alternatives to refrigerants including chlorofluorocarbons (CFCs), hydrochlorofluorocarbons (HCFCs) and hydrofluorocarbons (HFCs), which historically have found application as refrigerants across the refrigeration and air-conditioning industry. Fluoroolefins exhibit low GWP with little or no ozone depletion impact and are therefore a more environmentally friendly option than their predecessors. The low global warming effect of fluoroolefins is partly attributable to them being less thermally and chemically stable compared to CFCs, HCFCs and HFCs, due to the presence of a reactive site (a double bond) in their chemical structure. Whilst this reduced stability is favourable in terms of environmental impact it has negative implications when the fluoroolefin is in contact with other components of refrigeration circuit construction, and hence there is a need to chemically stabilize such systems. Consequently, the refrigeration lubricant used in conjunction with such refrigerants must offer properties specific to this type of refrigerant, such as appropriate miscibility and appropriate pressure-viscosity-temperature dynamics, and particularly must offer appropriate chemical, thermal and hydrolytic stability when combined with fluoroolefin refrigerants.

PAG lubricants are known for use with fluoroolefins. For example, US 2007/0069175 teaches mixtures of various fluoroalkenes with a variety of lubricants, including organic lubricants of the PAG type. US 2007/0069175 does not teach the suitability of one structural type of lubricant relative to another. Additionally, the disclosure does not address the significant impact on system stability of fluoroalkene type refrigerants and the modifications therefore required from the lubricant perspective, specifically with respect to the chemical stabilization of the lubricant-fluoroalkene regime.

Such chemical stabilization is taught in US 2009/0283712, which discloses that the addition of a radical scavenging sesquiterpene such as farnesol and/or farnesene at a dosage of 0.001 to about 10 weight percent into low GWP refrigerants such as fluoroalkenes increases the chemical stability and can slow the polymerization or decomposition of the fluoroalkene in storage and under conditions of elevated temperature, and slow the polymerization of PAG compressor lubricants.

However, the stabilizing capability of sesquiterpenes when added into PAG-fluoroalkene refrigerating systems can be shown to be highly limited, as are the proportions of sesquiterpene which may reasonably by utilized in the refrigeration system without potential adverse impact on other system components.

U.S. Pat. No. 7,252,779 and WO2014/144554 have taught the use of compositions based upon hydroxycarboxylic acid esters which have been shown to be useful as lubricant, heat transfer agent, rheological modifier, corrosion inhibitor, and to be useful in preventing lubricant degradation. It can be shown that the treatment of lubricant compositions of HVAC systems using such hydroxycarboxylic acid esters based compositions is impacted when refrigerants of the fluoroalkene type are employed, and that chemical stability is adversely affected by the presence of the refrigerant in conjunction with the hydroxycarboxylic acid ester based composition.

There remains a need in the industry for lubricants suitable for use with fluoroalkene refrigerants which are inherently stabilized, without the further need for addition of radical scavenging stabilisers into the system.

We have now found that use of a particular end group in a PAG lubricant affords stabilization benefits which greatly exceed those achievable by the physical addition of additives based on sesquiterpenes into the refrigeration system, and can reduce or eliminate the need for physical additisation into lubricating regimes routinely stabilized with scavenging additives such as free radical and acid scavengers. Further, the direct inclusion of a suitable end-group into the PAG lubricant structure affords stabilization benefits to systems which incorporate performance enhancing components such as hydroxycarboxylic acid esters.

SUMMARY OF THE INVENTION

The invention relates to a polyalkylene glycol having a terpenoid end group.

The invention provides a lubricating oil composition comprising a polyalkylene glycol having a terpenoid end group; a refrigerant composition which comprises a refrigerant together with a polyalkylene glycol having a terpenoid end group; a refrigeration system which comprises a refrigerant composition according to the invention; and a method of lubricating moving parts of an industrial or automotive system, which comprises applying to moving parts a polyalkylene glycol or a lubricant composition according to the invention.

DETAILED DESCRIPTION OF THE INVENTION

The applicants have discovered that direct inclusion of a terpenoid as an end group in the polymer structure of a PAG lubricant affords stabilization benefits which greatly exceed those achievable by the physical addition of additives based on terpenoids, which have previously been disclosed as suitable to mitigate the chemical and thermal degradation of chemically unstable species such as fluoroolefin refrigerants with which the lubricant is in contact when utilized in HVAC applications such as refrigeration systems.

The PAG according to the invention may contain $C_2$ alkylene oxide (ethylene oxide) monomer units, $C_3$ alkylene oxide (propylene oxide) monomer units, and/or higher alkylene oxide units, for example ($C_4$-8) alkylene oxide units. Although it is possible to use higher alkylene oxide units in the PAG of the invention and obtain all the advantages of the invention, it is an economic advantage of the present invention that its benefits can be obtained by using only $C_2$ and/or $C_3$ alkylene oxide units. Therefore preferably the number of higher ($C_4$ and greater) alkylene oxide units is 0. The total number of alkylene oxide units is preferably in the range of from 5 to 100, especially from 5 to 75.

The PAG may be a homopolymer or it may contain a mixture of different units. If it contains a mixture of different units, it may be in the form of a random copolymer or a block copolymer. It may be linear or branched, but is preferably linear.

A linear PAG will have two end groups, a branched PAG will have three or more end groups. A PAG may also contain two or more separate PAG chains: such multi-chain PAGs are generally prepared by using a multifunctional initiator, so that in the end product, two (or more) PAG chains will be terminated using a single di- (or multi-) valent end group. In all cases, at least one end group is a terpenoid. The other end group(s) may also be a terpenoid, but is preferably a hydrogen atom, an alkyl group, preferably a $C_{1-20}$alkyl group, especially a $C_{1-10}$alkyl group, or an acyl group, preferably a $C_{1-20}$acyl group, especially a $C_{1-10}$acyl group. Most preferably the other end group(s) is a hydrogen atom.

A linear PAG may be represented by the formula (I):

$$R(R^aO)_x(R^bO)_y(R^cO)_zR^d \qquad (I)$$

in which R is a terpenoid;
$R^a$ is a $C_2$ alkylene group; $R^b$ is a $C_3$ alkylene group; and $R^c$ is a $C_{4-8}$ alkylene group;
$R^d$ is a terpenoid, for example the same as R, or is a hydrogen atom, an alkyl group, preferably a $C_{1-20}$alkyl group, especially a $C_{1-10}$alkyl group, or an acyl group, preferably a $C_{1-20}$acyl group, especially a $C_{1-10}$acyl group;
x, y and z are each independently 0 or a number less than or equal to 100; and the sum of x+y+z is a number in the range of from 5 to 100.

Preferably $R^d$ is a $C_{1-4}$ alkyl group, especially a methyl group, or a hydrogen atom. Most preferably $R^d$ is a hydrogen atom. Preferably z is 0. Preferably x is 0. Preferably y is 5 to 75. Most preferably both z and x are 0 and z is 5 to 75; in this embodiment, the PAG is a homopolymer of polypropylene glycol (PPG).

Terpenoids, also known as isoprenoids, are a group of compounds derived from isoprene (methylbuta-1,3-diene, also known as hemi-terpene). Each terpenoid contains a definite number of isoprene units. Terpenoids may be cyclic or acyclic and include hemiterpenoids (5 carbons), monoterpenoids (10 carbons), sesquiterpenoids (15 carbons), diterpenoids (20 carbons), sestaterpenoids (25 carbons), triterpenoids (30 carbons), sesquaterpenoids (35 carbons), tetraterpenoids (40 carbons) and polyterpenoids (higher number of isoprene units). Any of these terpenoids may be used in the present invention.

Examples of acyclic naturally occurring terpenoids include:

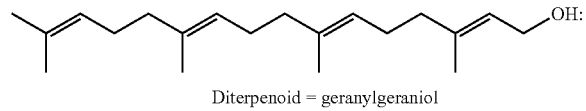

Diterpenoid = geranylgeraniol

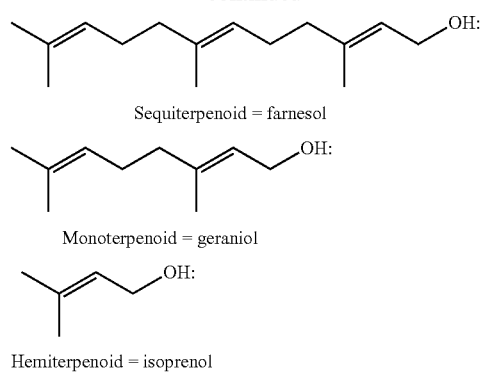

Sequiterpenoid = farnesol

Monoterpenoid = geraniol

Hemiterpenoid = isoprenol

The use of farnesol as an end group is preferred. Farnesol may consist of some or all of the following isomeric forms:

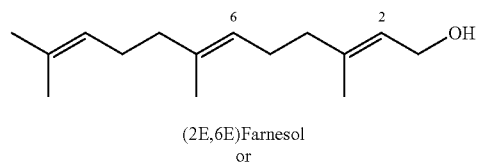

(2E,6E)Farnesol
or
(2E,6E)-3,7,11-trimethyldodeca-2,6,10-trien-1-ol

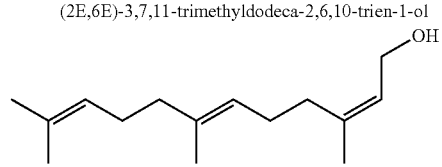

(2Z,6E)Farnesol
or
(2Z,6E)-3,7,11-trimethyldodeca-2,6,10-trien-1-ol

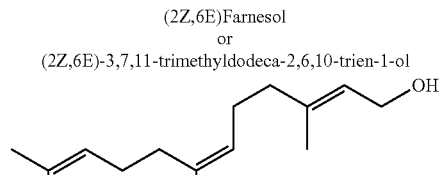

(2E,6Z)Farnesol
or
(2E,6Z)-3,7,11-trimethyldodeca-2,6,10-trien-1-ol

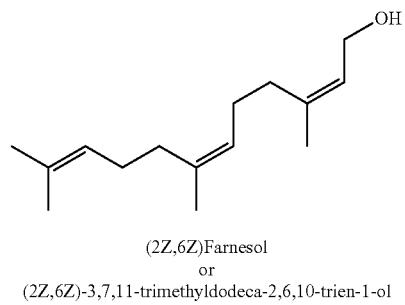

(2Z,6Z)Farnesol
or
(2Z,6Z)-3,7,11-trimethyldodeca-2,6,10-trien-1-ol

Within each terpenoid class (hemi- mono-, sesqui- etc.) there also exists an array of more complex acyclic alcohols. For example, well known within the diterpenoid class are:

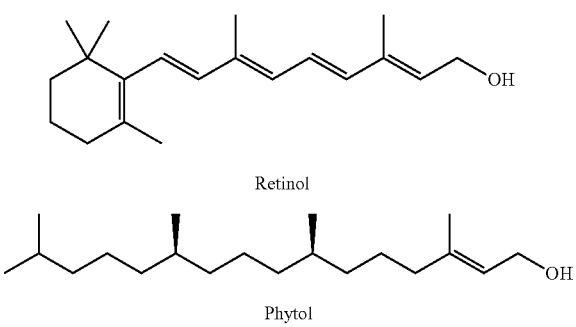

Retinol

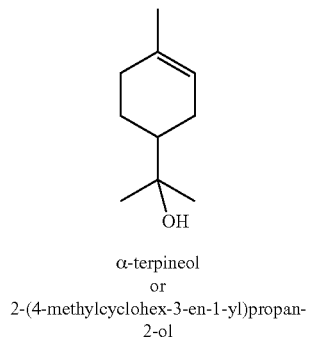

Phytol

Cyclic naturally occurring terpenoids may also be used, for example (but not limited to) the monoterpenoid class which are referred to as terpineols with the following structural formulae:

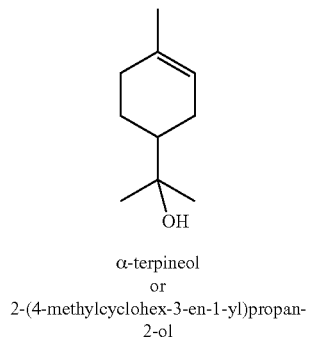

α-terpineol
or
2-(4-methylcyclohex-3-en-1-yl)propan-2-ol

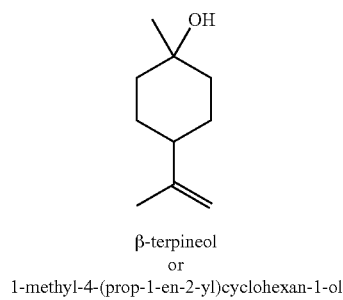

β-terpineol
or
1-methyl-4-(prop-1-en-2-yl)cyclohexan-1-ol

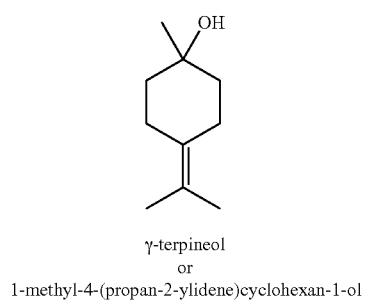

γ-terpineol
or
1-methyl-4-(propan-2-ylidene)cyclohexan-1-ol

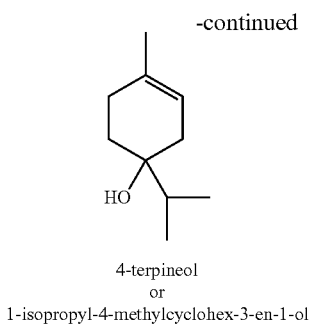

4-terpineol
or
1-isopropyl-4-methylcyclohex-3-en-1-ol

As well as or instead of carrying a hydroxy group as shown in all the structures above, terpenoids may bear amine, acid or acyl functionality. An example of each is shown below for the (E,E) geometric isomer of the sesquiterpenoid general structure. (Z,Z), (E,Z) and (Z,E) isomeric forms are also possible, as are amine, acid and acyl functionalized equivalents of terpenoids with different numbers of isoprene units.

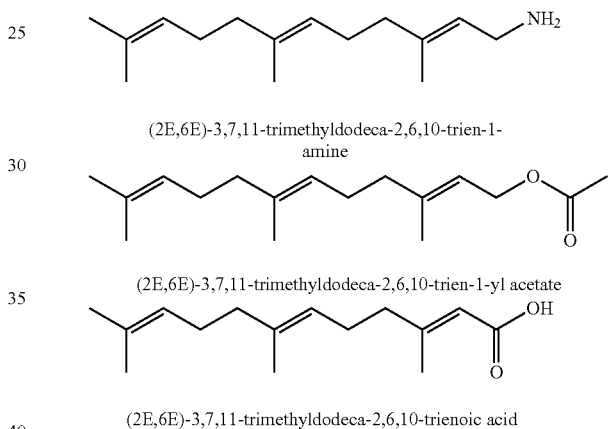

(2E,6E)-3,7,11-trimethyldodeca-2,6,10-trien-1-amine (2E,6E)-3,7,11-trimethyldodeca-2,6,10-trien-1-yl acetate (2E,6E)-3,7,11-trimethyldodeca-2,6,10-trienoic acid In the formula I, and its preferred embodiments above, preferably R is farnesol. In the specific embodiments where the terpenoid is farnesol, a preferred resultant PAG structure may be shown as follows:

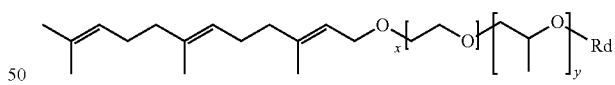

Preferably $R^d$=H and x=zero, and in this particularly preferred embodiment, the PAG is:

farnesol-$(C_3H_7O)_{5-75}$—H

Preferably the number average molecular weight of the PAG according to the invention is from 512 to 4,572 g/mol. Preferably it exhibits a kinematic viscosity in the range 10 to 460 cSt at 40° C. (measured in accordance with ASTM D445), a Viscosity Index of at least 150, a flashpoint and firepoint (both measured in accordance with the Cleveland Open Cup, COC, method ASTM D92) of at least 180° C., and/or a pourpoint (measured in accordance with method ASTM D97) of at least −40° C.

The PAGs according to the invention may be prepared by methods analogous to methods known in the art. A variety of methods of making end-capped PAGs are known, and any of these may be used. It is possible to add an end-cap to a pre-formed PAG, but this is a less-preferred process. In general, processes for forming PAGs start from an initiator containing an amine, acid, acyl or alcohol functionality, i.e. with an abstractable proton which is abstracted on reaction with an alkylene oxide, thus beginning a polymerization reaction. This reaction may for example be carried out by abstracting the proton by reaction with a catalyst, followed by subsequent reaction with the alkylene oxide(s). In the present invention, the initiator may be a terpenoid containing an amine, acid or alcohol functionality. For example, a terpenoid derivative containing an abstractable proton, particularly a terpenoid alcohol, for example ROH, will react with a catalyst, thus acting as an initiator for the polymerization reaction of an alkylene oxide, and the PAG chain may be built up from appropriate alkylene oxide units. If a mono-functionalised terpenoid, e.g. a mono-alcohol, is used, a PAG containing one PAG chain will result. If it is desired to prepare a compound having two or more PAG chains, an initiator having two or more groups reactive with the catalyst, e.g. two or more alcohol groups, may be used. The terpenoid group R in the formula I above will always be connected to an alkylene oxide unit $R^a/R^b/R^c$ through a heteroatom, the nature of the heteroatom depending on the nature of the functional group present in the original terpenoid.

Utility

The PAG according to the invention finds utility as a lubricant, and accordingly the present invention provides a lubricant composition comprising a PAG according to the invention. The PAG according to the invention may also be used in non-lubricating applications as a chemical stabiliser due to its radical scavenging abilities.

Lubricant compositions may include one or more known additives depending on the particular application. They may for example contain additives selected from those that provide improved antiwear properties, extreme pressure resistance, oxidation stability, corrosion inhibition, antifoaming, suppression of pour point, improvement of viscosity index, and reduction of acid content. Such additives if present are preferably present in an amount of up to 15% by weight of the composition.

The PAG may be present either as a primary or secondary component of a lubricant, for example it may be present as the only lubricant, or it may be present in admixture with one or more other lubricants. The other lubricant may for example be a different PAG lubricant, and/or it may be a different type of lubricant, for example a polyol ester, alkylbenzene, polyvinylether, and/or mineral oil.

The PAG or the lubricant composition of the invention may be used for example in industrial and automotive applications, where it may be used to lubricate the moving parts of any industrial plant or vehicle by application to the moving parts of the equipment. In a preferred embodiment, it finds utility as a lubricant in HVAC systems, for example refrigeration systems, particularly as a lubricant for use in the compressors of air conditioning, other cooling systems such as industrial and domestic refrigeration systems, or heat pump systems, and especially those utilising a fluoroolefin refrigerant.

Accordingly, the present invention also provides a refrigerant composition which comprises a refrigerant, together with, as lubricant, a PAG or a lubricant composition according to the invention. Preferably the refrigerant is selected from an HFO, HCFC, HFC, HC, $CO_2$ or $NH_3$, especially an HFO, especially a $C_3$-5 HFO, for example HFO-1234yf (1,3,3,3-tetrafluoroprop-1-ene) or HFO-1234ze (2,3,3,3-tetrafluoroprop-1-ene).

Refrigerant compositions according to the invention may also include performance enhancing additives component such as a dye, seal swell agent or lubricity booster, which in a preferred embodiment is a hydroxycarboxylic acid ester.

The invention also provides the following additional embodiments:

Embodiment 1. A polyalkylene glycol having a terpenoid end group.

Embodiment 2. A polyalkylene glycol according to embodiment 1, in which the terpenoid is a hemiterpenoid, monoterpenoid, sesquiterpenoid, diterpenoid, sestaterpenoid, triterpenoid, sesquaterpenoid, tetraterpenoid or polyterpenoid.

Embodiment 3. A polyalkylene glycol according to embodiment 2, in which the terpenoid is geranylgeraniol, farnesol, geraniol, isoprenol, retinol, phytol, or terpineol.

Embodiment 4. A polyalkylene glycol according to embodiment 2, in which the terpenoid is a sesquiterpenoid.

Embodiment 5. A polyalkylene glycol according to embodiment 4, in which the terpenoid is farnesol.

Embodiment 6. A polyalkylene glycol according to any one of the preceding a embodiments, which has the formula (I):

$$R(R^aO)_x(R^bO)_y(R_cO)_zR^d \qquad (I)$$

in which R is a terpenoid;
$R^a$ is a $C_2$ alkylene group; $R^b$ is a $C_3$ alkylene group; and $R^c$ is a $C_{4-8}$ alkylene group;
$R^d$ is a terpenoid, or is a hydrogen atom, an alkyl group, or an acyl group;
x, y and z are each independently 0 or a number less than or equal to 100; and the sum of x+y+z is a number in the range of from 5 to 100.

Embodiment 7. A polyalkylene glycol according to any one of the preceding embodiments, in which the alkylene glycol units are $C_2$ and/or $C_3$ units.

Embodiment 8. A polyalkylene glycol according to any one of the preceding embodiments, in which one end group is a terpenoid and the or each other end group(s) is a hydrogen atom, a $C_{1-20}$alkyl group, or a $C_{1-20}$acyl group.

Embodiment 9. A polyalkylene glycol according to embodiment 8, in which the or each other end group(s) is a methyl group or a hydrogen atom.

Embodiment 10. A polyalkylene glycol according to embodiment 9, in which the or each other end group is a hydrogen atom.

Embodiment 11. A polyalkylene glycol according to any one of the preceding embodiments, which contains from 5 to 75 $C_3$ alkylene glycol units and no $C_2$ or $C_{(4 \text{ or greater})}$ alkylene glycol units.

Embodiment 12. A polyalkylene glycol according to embodiment 1, which has the formula:

$$\text{farnesol-}(C_3H_7O)_{5\text{-}75}\text{—H}$$

Embodiment 13. A process for making a polylalkylene glycol according to any one of the preceding embodiments, which comprises reacting a terpenoid containing an amine, acid, acyl or alcohol functionality with an alkylene oxide.

Embodiment 14. A process according to embodiment 13, which comprises reacting a terpenoid containing an alcohol functionality with an alkylene oxide.

Embodiment 15. A lubricating oil composition comprising a polyalkylene glycol according to any one of embodiments 1 to 12.

Embodiment 16. A refrigerant composition which comprises a refrigerant together with a polyalkylene glycol according to any one of embodiments 1 to 12 or a lubricating oil composition as in embodiment 15.

Embodiment 17. A refrigerant composition according to embodiment 16, in which the refrigerant includes a fluoroolefin.

Embodiment 18. A refrigerant composition according to embodiment 17, in which the refrigerant includes refrigerant HFO-1234yf and/or refrigerant HFO-1234ze.

Embodiment 19. A refrigeration system which comprises a refrigerant composition according to any one of embodiments 16 to 18.

Embodiment 20. A method of lubricating moving parts of an industrial or automotive system, which comprises applying to moving parts a polyalkylene glycol according to any one of embodiments 1 to 12 or a composition according to embodiment 15.

The following Examples illustrate the invention.

EXAMPLES

Example 1—16 Mole Farnesol Propoxylate (Sample "16MIFP")

In a first step, 222.37 g of farnesol (commercially available as "Farnesol—mixture of isomers, ≥95%", ex-Sigma Aldrich) was dried to 0.01 wt % water content by nitrogen purging at 105° C. and catalysed with solid potassium hydroxide to a dosage of 0.250 wt % in the final product, followed by again drying to 0.01 wt % water content by nitrogen purging at 105° C. The material was then reacted with 522.72 g of propylene oxide at an initial addition temperature of 115° C. increasing to 138° C. until pressure line-out in the reaction vessel indicated reaction completion. The catalyst was thereafter removed from the product prior to sample testing by pressure filtration through a magnesium silicate filter media. The resulting polymer contained 16 propylene oxide units per farnesol molecule, and had a molecular weight of 1151.65, and had a molecular weight of 2894.05.

Example 2—46 Mole Farnesol Propoxylate (Sample "46MIFP")

In a first step, 222.37 g of farnesol (commercially available as "Farnesol—mixture of isomers, ≥95%", ex-Sigma Aldrich) was dried to 0.01 wt % water content by nitrogen purging at 105° C. and catalysed with solid potassium hydroxide to a dosage of 0.250 wt % in the final product, followed by again drying to 0.01 wt % water content by nitrogen purging at 105° C. The material was then reacted with 2671.68 g of propylene oxide at an initial addition temperature of 115° C. increasing to 138° C. until pressure line-out in the reaction vessel indicated reaction completion. The catalyst was thereafter removed from the product prior to sample testing by pressure filtration through a magnesium silicate filter media. The resulting polymer contained 46 propylene oxide units per farnesol molecule.

Example 3: Physical Property Testing

Measurement of physical properties of the products of Examples 1 and 2 of relevance for lubricating oils intended for the application were performed in accordance with industry standard ASTM methods. Results are shown in Table 1 below.

TABLE 1

| Property | Units | Method | 16 MIFP ISO Viscosity Grade 46 | 46 MIFP ISO Viscosity Grade 100 |
|---|---|---|---|---|
| Viscosity at 40° C. | cst | ASTM D445 | 47.14 | 106.3 |
| Viscosity at 100° C. | cst | ASTM D445 | 9.19 | 19.5 |
| Viscosity Index | | ASTM D2270 | 181.3 | 206.9 |
| Total Acid Number | mg KOH/g | ASTM D664 | 0.012 | −0.019 |
| Color | | ASTM D1500 | <1.5 | <1.5 |
| Flash Point | ° C. | ASTM D92 | 202 | 221 |
| Fire Point | ° C. | ASTM D92 | 282 | 282 |
| Pour Point | ° C. | ASTM D97 | −55 | −45 |
| Falex | lbf | ASTM D3233(b) | 1250 | 1250 |
| Density | g/cm3 | ASTM D1298 | 0.975 | 0.988 |
| 4-Ball (40 kg, 1 hr, 1200 rpm) | mm | ASTM D4172 | 0.5 | 0.46 |

The above physical property data provides evidence that the PAGs of the invention have physical characteristics highly consistent with the expectations and requirements of a PAG type lubricant basefluid, for example high viscosity index, high flashpoint & fire point, low pour point and good extreme pressure and antiwear properties.

Example 4. Stability Testing

Measurement of chemical, thermal and hydrolytic stability was performed by Sealed Glass Tube Testing (SGT) in accordance with the standard method Ashrae 97, in which the test lubricant, refrigerant gas (hydrofluoro olefin R1234yf) and metal coupons of copper, aluminium and steel are sealed in a previously evacuated glass tube for a fixed test period of 14 days at a temperature of 175° C. Test lubricant and refrigerant are used in equal proportions, and 1000 ppm of water is additionally dosed into the tubes to represent typical moisture contamination of a refrigeration circuit. The Cu, Al & Fe coupons are prepared in accordance with the standard and represent the primary construction metals of the refrigeration circuit. Pre- and post-test analysis of lubricant and coupons is reported to establish lubricant and refrigerant breakdown and degradative impact on the metallic system components. Each test is conducted in triplicate with results averaged for reporting purposes.

Definition of components used in SGT testing:

"Farnesol": farnesol—mixture of isomers, ≥95%", ex-Sigma Aldrich, dosed as an additive.

"MIFP": 16 MIFP (ISO Viscosity Grade 46) Example 1, as defined above.

"DEC PAG1": Polyalkylene glycol basefluid of the formula $CH_3O(C_3H_6O)_xCH_3$, where x is a number affording a final basefluid viscosity of 46 cSt at 40° C. in accordance with ASTM D445 method. This basefluid is widely used in lubricants for use with HFO based refrigeration systems, for example it is the basefluid in the lubricants PSD-1 (Idemitsu) and HD46 (Shrieve).

"HCAE": Hydroxycarboxylic acid ester based functional composition established in the industry to enhance refrigeration system performance. The material is prepared by transesterification of castor oil by n-propanol in the presence of 85% phosphoric acid catalyst. It is found in the commercial lubricants ICE 32 and Zerol ICE (Shrieve).

The results of the stability testing are shown in Table 2. In Table 2, the coupon qualitative assessment is as follows: 1A=unchanged in appearance, 1B=discolouration but to a lesser degree (and without any evidence of coupon degradation), 2=discolouration to a significant degree with evidence of coupon degradation.

TABLE 2

Sealed Glass Tube Data

| | Sample A 100% MIFP | | Sample B (comparative) 100% DEC PAG1 | | Sample C (comparative) 99% DEC PAG 1 + 1% Farnesol | |
|---|---|---|---|---|---|---|
| Lubricant Weight, g | 76.3 | | 83.16 | | 91.82 | |
| Refrigerant Weight, g | 76.35 | | 81.78 | | 95.71 | |
| | Before Exposure | After Exposure | Before Exposure | After Exposure | Before Exposure | After Exposure |
| Oil Appearance | Clear & homogeneous | Clear & homogeneous | Clear & homogeneous | Clear & homogeneous | Clear & homogeneous | Clear & homogeneous |
| Moisture, ppm | 1321 | 1012 | 995 | 719 | 1094 | 1247 |
| TAN, mgKOH/g | −0.002 | 0.226 | 0.001 | 0.267 | 0.001 | 0.141 |
| Pre/post test Cu weight change (%) | 0 | | 0.10 | | 0.10 | |
| Post-test Cu Observations | 1A | | 1A | | 1B (brown discolouration) | |
| Pre/post test Fe weight change (%) | 0.00 | | −0.30 | | 0.10 | |
| Post-test Fe Observations | 1A | | 1B (purple discolouration) | | 1B (purple discolouration) | |
| Pre/post test Al weight change (%) | 0.00 | | 0.10 | | 0.10 | |
| Post-test Al Observations | 1A | | 1A | | 1A | |
| | Sample D (comparative) 90% DEC PAG 1 + 10% Farnesol | | Sample E 98% DEC PAG 1 + 2% MIFP | | Sample F 99% DEC PAG 1 + 1% MIFP | |
| Lubricant Weight, g | 80.87 | | 81.93 | | 80.56 | |
| Refrigerant Weight, g | 80.75 | | 80.64 | | 78.73 | |
| | Before Exposure | After Exposure | Before Exposure | After Exposure | Before Exposure | After Exposure |
| Oil Appearance | Clear & homogeneous | Clear & homogeneous | Clear & homogeneous | Clear & homogeneous | Clear & homogeneous | Clear & homogeneous |
| Moisture, ppm | 1152 | 7547 | 903 | 430 | 933 | 1609 |
| TAN, mgKOH/g | 0.007 | 0.105 | 0.01 | −0.003 | 0.015 | 0.143 |
| Pre/post test Cu weight change (%) | 0.00 | | 0.00 | | −0.20 | |
| Post-test Cu Observations | 2 (large amount of purple residue) | | 1A | | 1A | |
| Pre/post test Fe weight change (%) | 0.00 | | −0.10 | | 0.40 | |
| Post-test Fe Observations | 1B (purple discolouration) | | 1A | | 1A | |
| Pre/post test Al weight change (%) | −0.20 | | −0.10 | | 0.10 | |
| Post-test Al Observations | 2 (wear on side in contact with Fe, red residue and wear on side in contact with Cu) | | 1A | | 1A | |
| | Sample G (comparative) 87.5% DEC PAG 1 + 12.5% HCAE | | Sample H (comparative) 85.5% DEC PAG 1 + 12.5% HCAE + 2.0 wt % Farnesol | | Sample I 87.5% MIFP + 12.5% HCAE | |
| Lubricant Weight, g | 80.33 | | 81.51 | | 76.28 | |
| Refrigerant Weight, g | 78.91 | | 80.78 | | 75.62 | |
| | Before Exposure | After Exposure | Before Exposure | After Exposure | Before Exposure | After Exposure |
| Oil Appearance | Clear & homogeneous | Brown particulate present | Clear & homogeneous | Enhanced yellow colour, but clear and homogeneous | Clear & homogeneous | Enhanced yellow colour, but clear and homogeneous |

TABLE 2-continued

Sealed Glass Tube Data

| | | | | | | |
|---|---|---|---|---|---|---|
| Moisture, ppm | 1200 | 2100 | 1007 | 2260 | 970 | 2400 |
| TAN, mgKOH/g | 1.506 | 3.128 | 1.492 | 2.661 | 2.431 | 1.392 |
| Pre/post test Cu weight change (%) | −0.20 | | 0.00 | | −0.10 | |
| Post-test Cu Observations | 1A | | 1A | | 1A | |
| Pre/post test Fe weight change (%) | −5.30 | | −4.50 | | −0.60 | |
| Post-test Fe Observations | 2 (complete discoloration) | | 1B (brown discoloration) | | 1A | |
| Pre/post test Al weight change (%) | −0.60 | | −0.30 | | 0.00 | |
| Post-test Al Observations | 1B (slight orange discoloration at coup edges) | | 1B (light brown discoloration) | | 1A | |

The results given in Table 2 illustrate the following:

Comparison of Sample A (according to the invention) and B (comparative) demonstrates the influence of incorporating a farnesyl functionality as an end group on the PAG basefluid, as "A" and "B" are structurally the same other than the "A" sample incorporates terminating farnesyl and hydroxy functionalities compared to "B" which incorporates a methoxy terminating species at both ends. This result allows simple conclusion that the farnesyl functionality retains its stabilization capability when incorporated into a polyalkylene glycol polymer structure via alkoxylation of the farnesol's hydroxyl functionality.

Samples C and D (both comparative) consider the prior art disclosure that the addition of a radical scavenging sesquiterpene such as farnesol and/or farnesene dosed as an additive at a dosage of 0.001 to about 10 weight percent into low GWP refrigerants such as fluoroalkenes will increase the chemical stability. The data demonstrates that whilst there is evidence of TAN increase being lower compared to the unadditised Sample B, stabilization is not adequately afforded by such a radical scavenging sesquiterpene in the presence of fluoroalkene in combination with the DEC PAG 1 basefluid (priorly defined as the primary industry adopted lubricant basefluid choice for HFO 1234yf systems to date), when utilized at an additive dosage rate of 1.0 or 10.0 wt %. This is evidenced by the poor post-test condition of the metal coupons, furthermore the data demonstrates that the inclusion of farnesol in an additive form has in fact contributed to chemical destabilization.

The preferential stability result of Sample A compared to C and D (reflected in preferential coupon condition/weight change) might reasonably be considered by one skilled in the art to be simply attributed to a higher farnesyl content in sample A, as the MIFP basefluid of Sample A contributes a farnesyl content of 19 wt % (based on structural composition of the basefluid). Further consideration is therefore made by analysis of Samples E and F regarding whether stability improvement demonstrated by Sample A is simply a farnesyl concentration effect or whether incorporation of the radical scavenging sesquiterpene into the PAG basefluid structure provides an unexpected benefit which could not have been predicted by one skilled in the art.

The farnesyl content of Samples E and F (both according to the invention) is 0.38 wt % and 0.19 wt % respectively based on the structural composition of the MIFP and the dosage utilized of 2% and 1% respectively. Sample E demonstrated the most superior stability result with a complete absence of coupon corrosion or post-test TAN increase. Sample F demonstrated some post-test TAN increase but this was in line with results observed for Samples C and D, however a significantly superior result for coupon appearance was obtained in comparison with samples B, C and D. It may be concluded that a highly acceptable and unexpected level of stabilization is afforded by utilisation of radical scavenging terpene specifically in the form of the terpenoid functionalized PAG, affording stabilisation at dosages which constitute a low farnesyl content.

Samples G (comparative), H (comparative) and I (according to the invention) give consideration to the potential stabilization by terpenoid functionalized PAG structures of refrigeration systems when other performance enhancing components such as hydroxycarboxylic acid ester are present. There are many examples of such performance enhancing components, these are frequently highly reactive in nature and in combination with HFO type refrigerants are found to have a highly detrimental impact on the stability of the refrigeration system. An objective of the invention is therefore to provide a means of stabilising systems utilising HFO refrigerants where there is a desire to incorporate performance enhancing components. A primary example selected to demonstrate the invention is the use of hydroxycarboxylic acid ester ("HCAE") based performance enhancers as taught in prior art U.S. Pat. No. 7,252,779 and WO2014/144554. Such performance enhancers are commonly used in combination with PAG basefluids including those of the type "DEC PAG 1".

Sample G demonstrates clearly the result obtained with respect to chemical destabilization in HFO systems when HCAE is utilized at a typical dosage of 12.5% required to provide efficacy in system performance enhancement. Post-test TAN increase, coupon appearance and significant coupon weight loss clearly demonstrate the system's chemical destabilization resulting from the combination of HCAE and HFO refrigerant. It is therefore also a specific aspect of this invention to provide a means of stabilising such systems by the use of terpenoid functionalised PAGs.

Sample H again considers the prior art disclosure that the addition of a radical scavenging sesquiterpene such as farnesol and/or farnesene at a dosage of 0.001 to about 10 weight percent into low GWP refrigerants such as fluoroalkenes will increases the chemical stability. Whilst a lower post-test TAN result and improved post-test lubricant appearance was achieved compared to Sample G, coupon appearance deterioration and weight loss gain provide evidence of an unacceptable level of chemical destabilization.

Sample I provides evidence of the capability of the invention to stabilize the highly reactive combination of HFO refrigerants and performance enhancing chemistries. In order to stabilize such systems it is identified that terpenoid-terminated PAGs provide again an unexpected benefit, whereby an acceptable level of system stabilization has been found to be achieved only by the use of the MIFP at a dosage which provides an optimized level of farnesyl (16.625% based on MIFP composition and dosage) in combination with the unexpected benefit previously observed of the farnesyl being incorporated into the PAG structure rather than dosed independently as an additive.

The above results clearly demonstrate that the products of the present invention have unexpected and advantageous properties making them particularly suitable for use in refrigeration applications where fluoroalkene refrigerants are utilised and also find further application in stabilizing such refrigeration systems when other chemically reactive performance enhancing components have been found to have detrimental impact on the stability of the refrigeration system.

The foregoing has outlined the features and technical advantages of the present invention. It will be appreciated by those skilled in the art that the embodiments disclosed may be readily utilized as a basis for modifying or designing other embodiments for carrying out the same purposes of the present invention. Such equivalent constructions do not depart from the spirit and scope of the invention as set forth in the appended claims.

The invention claimed is:

1. A lubricating oil composition comprising a polyalkylene glycol having a terpenoid end group, wherein the lubricating oil composition also comprises one or more other lubricants selected from a different polyalkylene glycol lubricant, a polyol ester, an alkylbenzene, a polyvinylether and a mineral oil and wherein the polyalkylene glycol is in the form of a homopolymer or a random copolymer.

2. The lubricating oil composition as claimed in claim 1, in which the terpenoid is a hemiterpenoid, monoterpenoid, sesquiterpenoid, diterpenoid, sestaterpenoid, triterpenoid, sesquaterpenoid, tetraterpenoid or polyterpenoid.

3. The lubricating oil composition as claimed in claim 2, in which the terpenoid is geranylgeraniol, farnesol, geraniol, isoprenol, retinol, phytol, or terpineol.

4. The lubricating oil composition as claimed in claim 2, in which the terpenoid is a sesquiterpenoid.

5. The lubricating oil composition as claimed in claim 4, in which the terpenoid is farnesol.

6. The lubricating oil composition as claimed in claim 1, in which the alkylene glycol units of the polyalkylene glycol having a terpenoid end group are $C_2$ and/or $C_3$ units.

7. The lubricating oil composition as claimed in claim 1, in which the polyalkylene glycol having a terpenoid end group further comprises one or more additional end groups, the one or more additional end groups being a hydrogen atom, a $C_{1-20}$alkyl group, or a $C_{1-20}$acyl group.

8. The lubricating oil composition as claimed in claim 7, in which the one or more additional end groups is a methyl group or a hydrogen atom.

9. The lubricating oil composition as claimed in claim 8, in which the one or more additional end groups is a hydrogen atom.

10. The lubricating oil composition as claimed in claim 1, in which the polyalkylene glycol having a terpenoid end group contains from 5 to 75 $C_3$ alkylene glycol units and no $C_2$ or $C_{(4\ or\ greater)}$ alkylene glycol units.

11. The lubricating oil composition as claimed in claim 1, in which the polyalkylene glycol having a terpenoid end group has the formula:

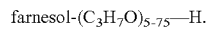

farnesol-$(C_3H_7O)_{5-75}$—H.

12. The lubricating oil composition as claimed in claim 1, which also comprises one or more additives selected from those that provide improved antiwear properties, extreme pressure resistance, oxidation stability, corrosion inhibition, antifoaming, suppression of pour point, improvement of viscosity index, and reduction of acid content.

13. A refrigerant composition which comprises a refrigerant together with the polyalkylene glycol having a terpenoid end group or the lubricating oil composition as claimed in claim 1.

14. The refrigerant composition as claimed in claim 13, in which the refrigerant includes a fluoroolefin.

15. The refrigerant composition as claimed in claim 14, in which the refrigerant includes refrigerant HFO-1234yf and/or refrigerant HFO-1234ze.

16. The refrigerant composition as claimed in claim 13 in which the refrigerant is selected from a hydrofluoro-olefin (HFO), hydrochlorofluorocarbon (HCFC), hydrofluorocarbon (HFC), hydrocarbon (HC), $CO_2$ or $NH_3$, or combinations thereof.

17. A refrigeration system which comprises the refrigerant composition as claimed in claim 13.

18. A method of lubricating moving parts of an industrial or automotive system, which comprises applying to moving parts the lubricating oil composition as claimed in claim 1.

* * * * *